Sept. 28, 1965     A. J. WATTS     3,208,499
TIRES OR TIRE-LIKE MEMBERS
Filed Aug. 22, 1963     2 Sheets-Sheet 1

INVENTOR
ARTHUR JOSIAH WATTS
BY
ATTORNEY

United States Patent Office 3,208,499
Patented Sept. 28, 1965

3,208,499
TIRES OR TIRE-LIKE MEMBERS
Arthur Josiah Watts, Lydney, England, assignor to International Segment Tire and Rubber Company, Inc., Chattanooga, Tenn., a corporation of Tennessee
Filed Aug. 22, 1963, Ser. No. 303,818
Claims priority, application Great Britain, Aug. 24, 1962, 32,664/62
2 Claims. (Cl. 152—307)

This invention relates to tire or tire-like members which are solid, i.e. non-pneumatic and of the type made up of a circumferentially extending series of radially aligned rubber, or synthetic rubber, or rubber and fabric, or rubber and metal segments, secured together in face-to-face relation to form the tire annulus under the compression of endless metal tie means extending around and within the said annulus.

Heretofore, segments have always been formed from the side walls of scrap tires due to the ease of stamping out with the natural taper and the tread portion of the casing, is not used, producing the following disadvantages:

(1) usually the centre of the tread portion of the casing is worn to such a degree that the rubber is extremely thin. This makes it impossible to stamp out the segments from the tread only of the scrap tire as the correct tapers cannot be obtained by skiving and grinding.

(2) the portion of the tire casing containing the maximum amount of rubber i.e. the side edges and the top of the shoulder is not utilised.

(3) the necessary taper cannot usually be achieved as too much fabric has to be removed by machining which weakens the segment to the detriment of the tire strength.

An object of the present invention is to provide a solid tire of the type indicated in which the compressive forces on the segments in the region of the outer periphery of the tire are reduced in order to improve the flexibility and road holding grip or traction of the tire and allow a greater area of rubber for bonding.

Accordingly, the present invention consists in a solid tire or tire-like member of the tire indicated in which the angle of taper of at least one face of each or certain of the segments is reduced or even reversed towards the outer periphery of the tire in order to reduce the compressive forces on the segments in the region of the outer periphery.

For the reasons stated above, the segments have heretofore always been formed from the side walls of the scrap tire casings, but preferably the segments according to the present invention are formed from a combination of the side wall and tread of the casings, which construction readily provides the required reduction, or reversal, in the angle of taper and gives the following advantages:

(a) more even wear and flexibility also longer life is obtained as the percentage of rubber content is much greater and remains so to a greater depth of tire wear.

(b) it is possible to obtain a longer segment from any given size of tire casing, using the top corner which is machined off and straightened out, providing a reduction or reversal in the angle of taper of the segment.

(c) a greater proportion of the scrap casing being utilised includes the shoulder portion of the side wall and tread containing the maximum amount of rubber and so makes possible lugs preferably with tapered side wings, or tread rubber with lateral grooves for flexibility and grip, to be bonded thereto.

Figure 1:
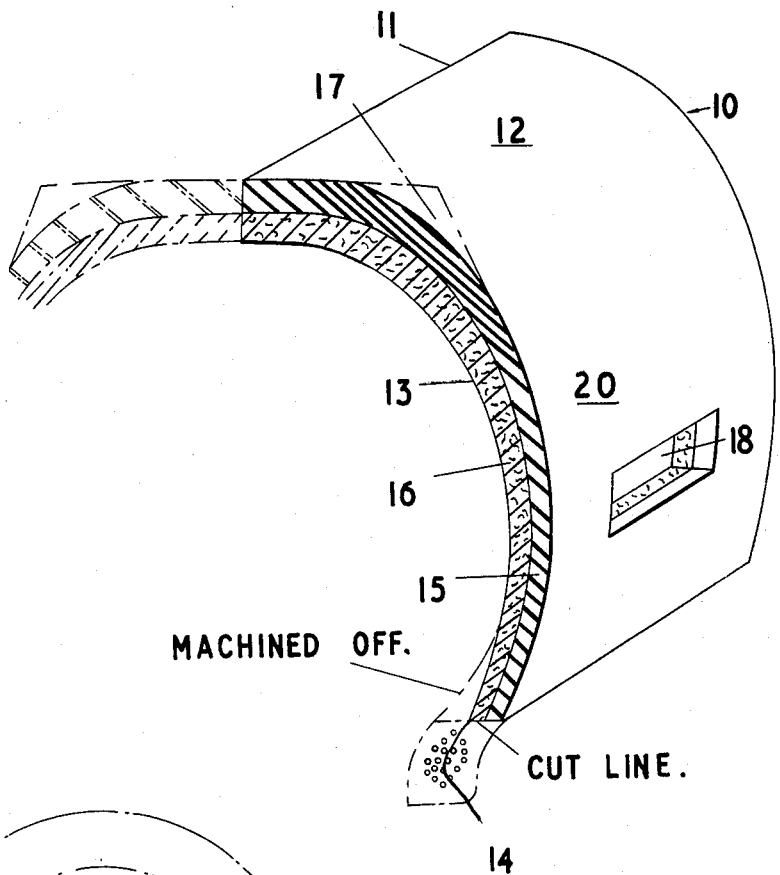
FIGURE 1 is a perspective view of a tire segment according to the present invention showing its formation from the tread and side wall portions of a scrap tire.

In carrying the invention into effect according to one convenient mode, by way of example, as shown in FIGURE 1, the basic segments 10 are formed by first removing the excess rubber from the shoulder 17 by buffing or machining in order to achieve subsequent flattening of the segment, and then cutting the scrap tire casing circumferentially at 11. The tread portion 12 and side wall portion 20 are then stamped out to form segments of various sizes to suit the required dimensions, bounded by the lines 11, 13 and 14. This operation produces a segment formed from a laminate comprising a layer of rubber 15 and a layer of fabric 16 which is approximately C shaped in cross-section which has been rendered capable of flattening by removal of the excess shoulder rubber as described above.

Figure 2:
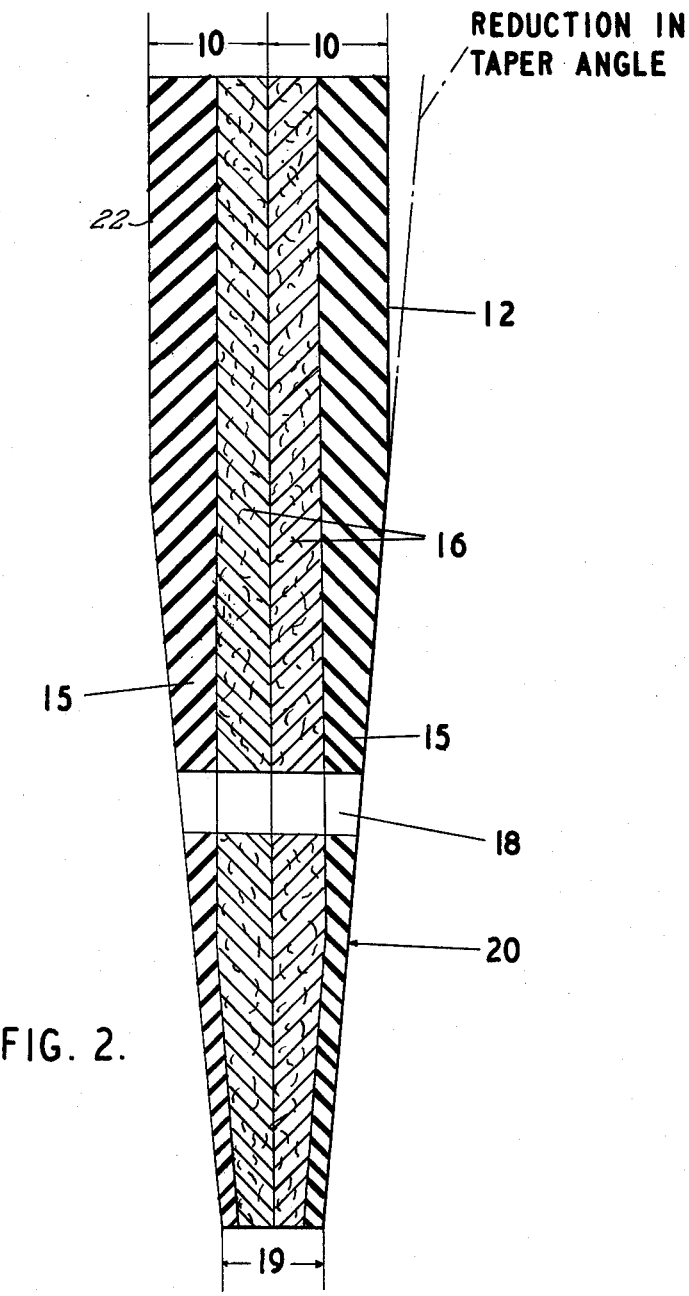
FIGURE 2 is a section through a pair of tire segments joined together to form a pad.

The resultant segment has a reduction in taper as shown in FIGURE 2 and a more uniform thickness of rubber extending for approximately one-third of the length of the segment from the tread portion 12 thereof which provides even wear, greater flexibility and prolonged tire life. The basic segments 10 referred to above, are shaped to correspond in section to the desired profile of the tire and are provided with the precise taper required by grinding or machining.

If scrap tires having thin side walls, thin tread, or insufficient rubber are used, a shaped insert (not shown) formed of rubber, or rubber and fabric, or rubber and metallic threads is inserted at any desired spacing between the tire segments 10, thus forming a three segment pad instead of a two segment pad as shown in FIGURE 2. A thin tapered segment of rubber can be inserted between the two fabric and rubber segments to increase the rubber content. The segments 10 can be joined with fabric-to-fabric, or rubber-to-fabric, or rubber-to-rubber. For some tires it may be found advantageous to use individual segments without joining.

It will be appreciated that when formed into a tire annulus, the whole of the faces of adjacent abutting segments 10 are at all times supporting and in contact with one another due to the compressive force exerted by the inextensible tie means 21, which may be a circular steel band, chain, or the like, and which passes through an aperture 18 in each segment, but the change in taper reduces the compressive force of the rubber in the region of the outer periphery of the tire which increases the flexibility, grip and tire life.

In order to facilitate handling, prior to forming the tire annulus, a pair of segments as described above are preferably stapled or otherwise joined together in face-to-face relationship to form pads 19 as shown in FIGURE 2 in which the layers of like material, i.e. rubber or fabric are in contact with one another. Each pad 19 may have the insert referred to above interposed between the segments or between adjacent pairs of segments which provides additional flexibility. The increased rubber area also renders the formed tire capable of having lugs or treads applied thereto.

Figure 3:
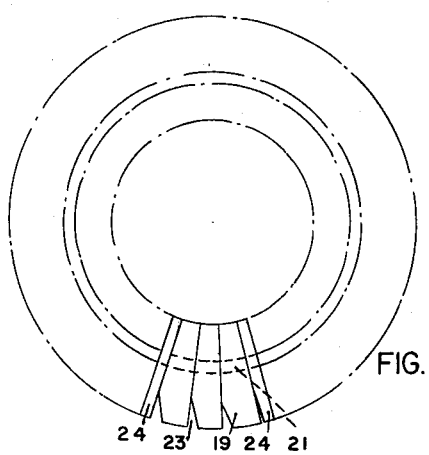
FIGURE 3 is a partial side elevation, on a reduced scale, showing how the pads appear when assembled, before compression thereof.

The reduced or reversely tapered faces 22 near the outer peripheries of the segments cause slight crevices 23 between the pads before they are compressed, as shown in FIGURE 3. This reduces the compressive forces on the segments in the region of their outer peripheries, thereby improving the flexibility and road holding grip or traction of the tire. The shaped inserts 24 described above are also shown in FIGURE 3.

Although the particular embodiment described utilises side walls 20 and tread portions 12 of scrap tire casings as a convenient method of producing segments 10 having a reduction or reversal of taper, it will be appreciated that the segments may be moulded or extruded and that the reduction or reversal of taper may, if required, be provided on both sides of the segment.

I claim:

1. In a non-pneumatic tire in the shape of a solid toroid including a series of radially disposed segments of fabric and rubber layers of substantial thickness throughout their lengths having aligned apertures therein with tie means passing through the apertures holding the segments under compression, the improvement in which the rubber layer of each segment is of substantially uniform thickness for approximately one third of the length of the segment from the tread portion thereof.

2. In a non-pneumatic tire in the shape of a solid toroid including a series of radially disposed segments of fabric and rubber layers of substantial thickness throughout their lengths having aligned apertures therein with tie means passing through the apertures holding the segments under compression, the improvement consisting of having the angle of taper of one face of certain of the segments reduced adjacent the outer periphery of the tire and in which shaped inserts consisting at least partly of rubber are positioned between segments.

References Cited by the Examiner

UNITED STATES PATENTS 2,801,463 8/52 Mitchell.
2,901,020 8/59 Starr et al. _____ 152—307

FOREIGN PATENTS 20,721 1904 Great Britain.

ARTHUR L. LA POINT, *Primary Examiner.*